US009785267B2

(12) United States Patent
Hasu

(10) Patent No.: US 9,785,267 B2
(45) Date of Patent: Oct. 10, 2017

(54) DISPLAY APPARATUS, DISPLAY SYSTEM, AND CONTROL METHOD

(71) Applicant: Seiko Epson Corporation, Tokyo (JP)

(72) Inventor: Tatsuhiro Hasu, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 3 days.

(21) Appl. No.: 14/532,657

(22) Filed: Nov. 4, 2014

(65) Prior Publication Data

US 2015/0130717 A1 May 14, 2015

(30) Foreign Application Priority Data

Nov. 8, 2013 (JP) .................................. 2013-231920

(51) Int. Cl.
| | |
|---|---|
| *G06K 9/46* | (2006.01) |
| *G06F 3/033* | (2013.01) |
| *G06T 7/20* | (2017.01) |
| *G03B 21/00* | (2006.01) |
| *G06F 3/038* | (2013.01) |
| *G06F 3/041* | (2006.01) |
| *G06T 7/73* | (2017.01) |
| *G06F 3/03* | (2006.01) |
| *G06F 3/042* | (2006.01) |

(52) U.S. Cl.
CPC .......... *G06F 3/0386* (2013.01); *G06F 3/0418* (2013.01); *G06T 7/74* (2017.01); *G06F 3/0304* (2013.01); *G06F 3/042* (2013.01); *G06T 2207/10016* (2013.01); *G06T 2207/20224* (2013.01)

(58) Field of Classification Search
CPC ..... G06T 7/0044; G06T 7/204; G06F 3/0304; G06F 3/0386; G06F 3/0418; G06F 3/042
See application file for complete search history.

(56) References Cited

U.S. PATENT DOCUMENTS

| | | | | |
|---|---|---|---|---|
| 5,138,304 A | * | 8/1992 | Bronson | ............... G06F 3/0386 345/157 |
| 5,528,263 A | * | 6/1996 | Platzker | .................. G06F 3/011 345/156 |
| 5,712,658 A | | 1/1998 | Arita et al. | |
| 5,835,078 A | | 11/1998 | Arita et al. | |
| 5,914,783 A | * | 6/1999 | Barrus | ..................... G01S 3/784 345/157 |

(Continued)

FOREIGN PATENT DOCUMENTS

| | | |
|---|---|---|
| JP | 7-200157 | 8/1995 |
| JP | 10-326151 A | 12/1998 |

(Continued)

*Primary Examiner* — Michael J Eurice
(74) *Attorney, Agent, or Firm* — ALG Intellectual Property, LLC

(57) ABSTRACT

A display apparatus includes a display section that displays a displayed image on a display surface based on an original image, an imaging section that captures the displayed image displayed on the display surface by the display section, a generation section that generates a difference image representing a difference between a captured image produced by the imaging section that captures the displayed image and the original image, and an instruction section that instructs the display apparatus to take a predetermined action based on a temporal change in the difference image generated by the generation section.

9 Claims, 5 Drawing Sheets

(56) References Cited

U.S. PATENT DOCUMENTS

| | | | |
|---|---|---|---|
| 6,188,388 B1 | 2/2001 | Arita et al. | |
| 6,317,266 B1* | 11/2001 | Yoshimura | G02B 27/20 |
| | | | 345/157 |
| 6,963,331 B1* | 11/2005 | Kobayashi | G06F 3/0386 |
| | | | 345/158 |
| 8,917,905 B1* | 12/2014 | Dill | A63J 1/02 |
| | | | 362/145 |
| 2002/0042699 A1* | 4/2002 | Tanaka | G06F 3/0386 |
| | | | 703/2 |
| 2003/0052859 A1* | 3/2003 | Finley | G06F 3/0386 |
| | | | 345/156 |
| 2004/0085522 A1* | 5/2004 | Honig | G03B 21/26 |
| | | | 353/121 |
| 2005/0162384 A1* | 7/2005 | Yokoyama | G03B 7/099 |
| | | | 345/156 |
| 2009/0021480 A1* | 1/2009 | Tagawa | G06F 3/0386 |
| | | | 345/158 |
| 2010/0157254 A1 | 6/2010 | Ishii | |
| 2011/0119638 A1* | 5/2011 | Forutanpour | G06F 3/03542 |
| | | | 715/863 |
| 2014/0139467 A1* | 5/2014 | Ghosh | G06F 3/0416 |
| | | | 345/173 |

FOREIGN PATENT DOCUMENTS

| | | |
|---|---|---|
| JP | 2002-262180 A | 9/2002 |
| JP | 2004-310528 | 11/2004 |
| JP | 2005-292178 A | 10/2005 |
| JP | 2007-114820 A | 5/2007 |
| JP | 2009-064110 A | 3/2009 |
| JP | 2009-276507 A | 11/2009 |
| JP | 2010-258753 A | 11/2010 |
| JP | 2011-188008 A | 9/2011 |
| JP | 2012-203311 A | 10/2012 |

\* cited by examiner

DISPLAY APPARATUS, DISPLAY SYSTEM, AND CONTROL METHOD

The entire disclosure of Japanese Patent Application No. 2013-231920, filed Nov. 8, 2013, is expressly incorporated by reference herein.

BACKGROUND

1. Technical Field

The present invention relates to a display apparatus, a display system, and a control method.

2. Related Art

There is a known projector of related art so configured as shown in JP-A-2005-292178 that when the projector projects an image onto a screen and a laser pointer that is an instruction apparatus is used to point the image, the projector detects the pointed position and displays an area according to the detected position with the area enlarged or reduced. A projector of this type includes a camera and a filter that allow selective detection of light of a predetermined wavelength region to which the wavelength of the laser light radiated from the laser pointer belongs to distinguish a spot formed by the laser light on the screen from an image displayed by the projector.

However, advances in a display device and video signal processing used in a projector have widened a color range of a displayable image, resulting in wrong recognition of part of an image displayed on a screen to be a spot or unsuccessful detection of a spot superimposed on an image in some cases, in other words, a decrease in reliability of not only the spot detection but also the laser-pointer-based pointing operation.

SUMMARY

An advantage of some aspects of the invention is to provide a display apparatus that detects an action specifying spot radiated with a laser pointer with improved precision.

The invention can be implemented as the following aspects or application examples.

APPLICATION EXAMPLE 1

A display apparatus according to this application example includes a display section that displays a displayed image on a display surface based on an original image, an imaging section that captures the displayed image displayed on the display surface by the display section, a generation section that generates a difference image representing a difference between a captured image produced by the imaging section that captures the displayed image and the original image, and an instruction section that instructs the display apparatus to take a predetermined action based on a temporal change in the difference image generated by the generation section.

According to the configuration described above, a displayed image is displayed on a display surface based on an original image, a difference image representing a difference between a captured image produced by capturing the displayed image and the original image is generated, and the instruction section instructs the display apparatus to take a predetermined action based on a temporal change in the difference image. Therefore, since an action is specified based on the temporal change in the difference image containing the difference between the captured image and the original image, wrong recognition of the difference image that occurs when the difference image and the original image have the same color range can be avoided, whereby the difference can be extracted with improved reliability, and a predetermined action specified based on the temporal change in the difference image can be identified with improved precision.

APPLICATION EXAMPLE 2

In the display apparatus according to the application example described above, it is preferable that the generation section compares the captured image with the original image, extracts a light spot that is not contained in the original image from the captured image, and generates the difference image containing the extracted light spot.

According to the configuration described above, a light spot that is not contained in the original image but is contained in the captured image can be extracted, and the difference image containing the extracted light spot can be produced.

APPLICATION EXAMPLE 3

In the display apparatus according to the application example described above, it is preferable that the display apparatus further includes a correction section that corrects the captured image and the original image, and after the correction section corrects at least one of the captured image and the original image, the generation section compares the captured image with the original image.

According to the configuration described above, after the correction section corrects at least one of the captured image and the original image, the captured image is compared with the original image, whereby the comparison precision can be improved.

APPLICATION EXAMPLE 4

In the display apparatus according to the application example described above, it is preferable that the correction section includes a first correction section that corrects the captured image and a second correction section that corrects the original image.

According to the configuration described above, even when the second correction section corrects the original image, the first correction section corrects the captured image in accordance with the correction made by the second correction section, whereby the difference image can be appropriately generated.

APPLICATION EXAMPLE 5

In the display apparatus according to the application example described above, it is preferable that the light spot is formed with light rays radiated toward the display surface.

APPLICATION EXAMPLE 6

In the display apparatus according to the application example described above, it is preferable that the instruction section extracts a change pattern in accordance with which the light spots changes as time elapses from the difference image formed of a plurality of difference images and instructs the display apparatus to take the predetermined action based on the extracted change pattern.

According to the configuration described above, a predetermined action can be specified based on a variety of change patterns in accordance with which the light spot changes.

APPLICATION EXAMPLE 7

In the display apparatus according to the application example described above, it is preferable that the display apparatus further includes an action instruction table that relates the change pattern to an action instruction, and the instruction section acquires the action instruction corresponding to the extracted change pattern from the action instruction table.

According to the configuration described above, since the instruction section refers to the action instruction table to acquire an action instruction according to the change pattern, whereby the change pattern can be readily related to an action instruction.

APPLICATION EXAMPLE 8

In the display apparatus according to the application example described above, it is preferable that the change pattern is at least one of a trajectory along which the light spot moves, a variation in frequency at which the light spot blinks, and a variation in luminance intensity of the light spot.

APPLICATION EXAMPLE 9

In the display apparatus according to the application example described above, it is preferable that the instruction section instructs the display apparatus to take a display action using the display section, an action of switching an image displayed by the display section to another, or an interactive action of manipulating the displayed image.

APPLICATION EXAMPLE 10

A display system according to this application example includes a display apparatus that displays an image and an instruction apparatus that instructs the display apparatus. The display apparatus includes a display section that displays a displayed image on a display surface based on an original image, an imaging section that captures the displayed image displayed on the display surface by the display section, a generation section that generates a difference image representing a difference between a captured image produced by the imaging section that captures the displayed image and the original image, and an instruction section that instructs the display apparatus to take a predetermined action based on a temporal change in the difference image generated by the generation section. The instruction apparatus radiates light rays onto the display surface on which the displayed image is displayed to form a light spot an image of which can be captured by the imaging section in such a way that the light spot is superimposed on the displayed image.

According to the configuration described above, a displayed image is displayed on a display surface based on an original image, a difference image representing a difference between a captured image produced by capturing the displayed image and the original image is generated, and the instruction section instructs the display apparatus to take a predetermined action based on a temporal change in the difference image. Therefore, since an action is specified based on the temporal change in the difference image containing the difference between the captured image and the original image, wrong recognition of the difference image that occurs when the difference image and the original image have the same color range can be avoided, whereby the difference can be extracted with improved reliability, and a predetermined action specified based on the temporal change in the difference image can be identified with improved precision.

APPLICATION EXAMPLE 11

A control method according to this application example includes displaying a displayed image on a display surface based on an original image, capturing the displayed image displayed on the display surface in the displaying, generating a difference image representing a difference between a captured image produced by capturing the displayed image in the capturing and the original image, and instructing the display apparatus to take a predetermined action based on a temporal change in the difference image generated in the generating.

According to the method described above, a displayed image is displayed on a display surface based on an original image, a difference image representing a difference between a captured image produced by capturing the displayed image and the original image is generated, and the instruction section instructs the display apparatus to take a predetermined action based on a temporal change in the difference image. Therefore, since an action is specified based on the temporal change in the difference image containing the difference between the captured image and the original image, wrong recognition of the difference image that occurs when the difference image and the original image have the same color range can be avoided, whereby the difference can be extracted with improved reliability, and a predetermined action specified based on the temporal change in the difference image can be identified with improved precision.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below with reference to the drawings.

Embodiment

A description will be made of a projector 10 as a display apparatus according to an embodiment of the invention, which modulates light emitted from a light source in accordance with an image signal and enlarges and projects the modulated light onto a display surface, such as a screen, for image display.

Figure 1:
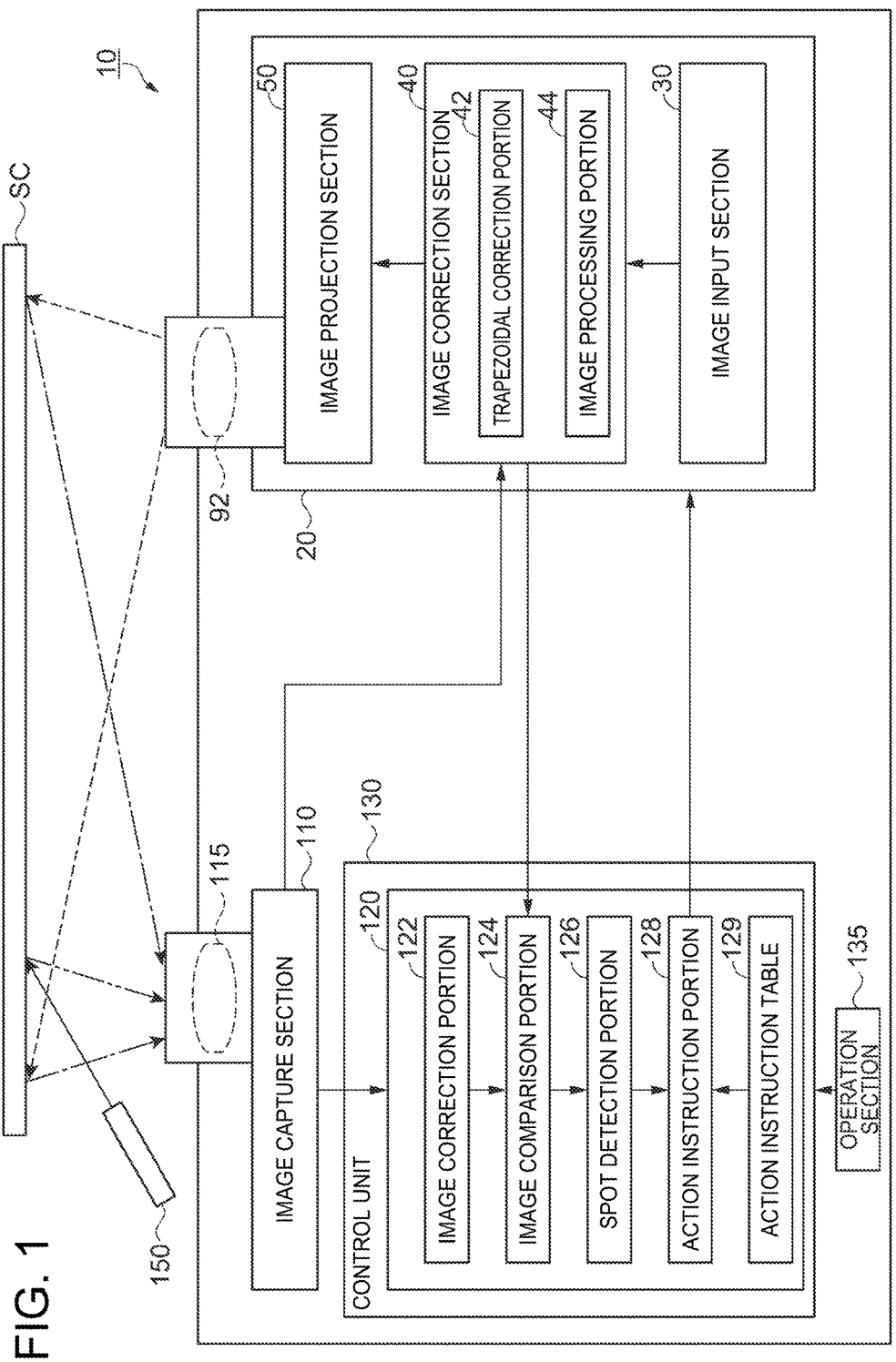
FIG. 1 is a block diagram showing a functional configuration of a projector according to an embodiment of the invention.

FIG. 1 is a block diagram showing a functional configuration of the projector 10. The projector 10 includes an image input section 30, an image correction section 40, an image projection section 50, an image capture section 110, a control unit 130, and an operation section 135. The control unit 130 includes an instruction control section 120.

The image input section 30, the image correction section 40, and the image projection section 50 form a projection unit 20. The image projection section 50 corresponds to a display section.

In the present embodiment, the projector 10 and a laser pointer 150 forms a display system.

Figure 3:
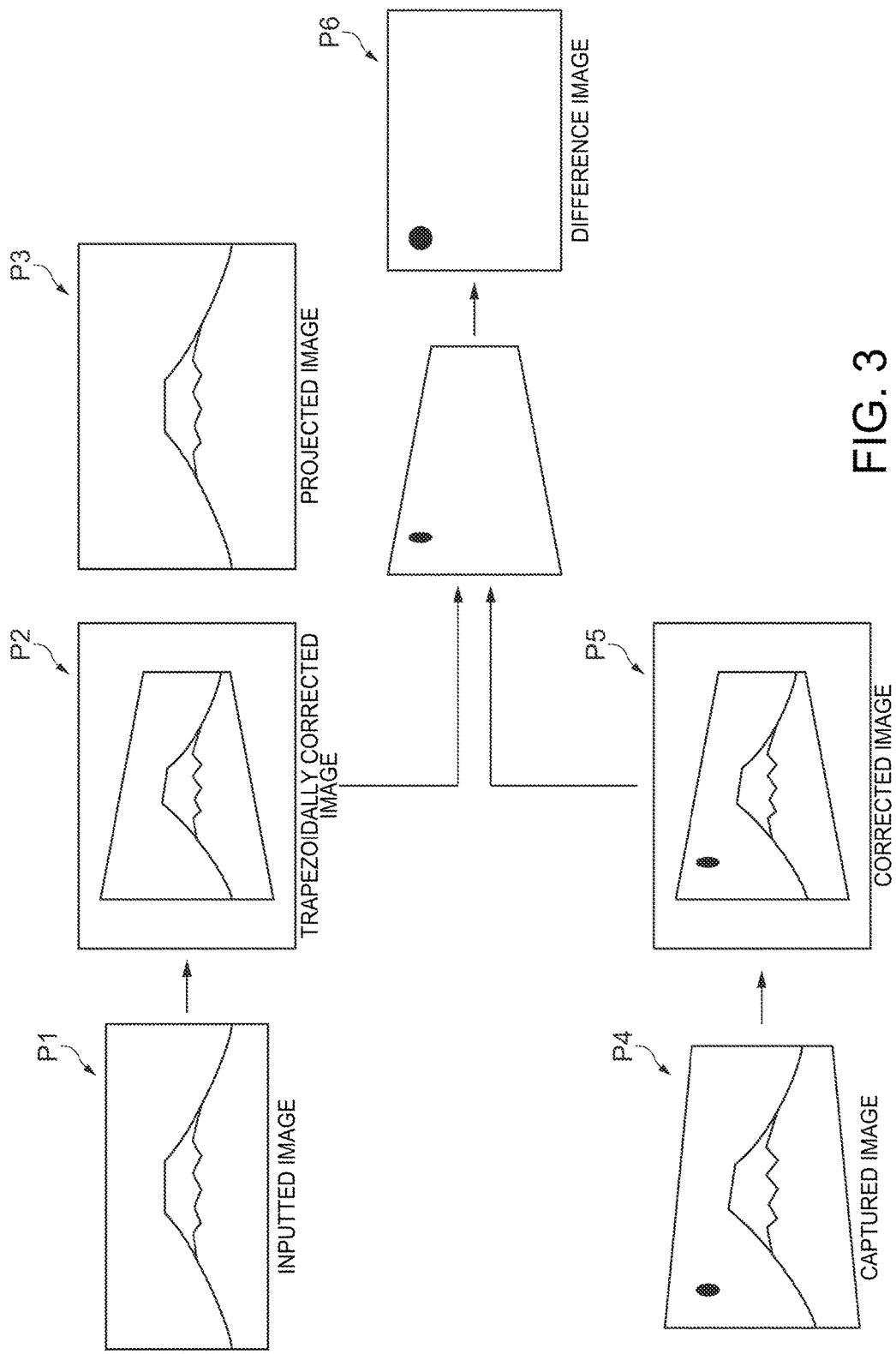
FIG. 3 shows a conceptual image in each function.

The image input section 30 receives a content image in a variety of formats as an input image (original image) P1 (FIG. 3). The following aspects are assumed in the present embodiment: an aspect in which data are outputted from a computer, a DVD reproduction apparatus, or any other apparatus connected to the image input section 30 in a predetermined connection method; an aspect in which data stored in a flash memory are read; an aspect in which data are inputted over the Internet or any other network; and an aspect in which data stored in the projector 10 are read. The "original image" therefore includes not only an image supplied from an apparatus external to the projector 10 but also an image stored in the projector 10 in advance.

The image input section 30 converts image data on the accepted input image P1 into data in a predetermined internal format and outputs the converted image data to the image correction section 40. In the present embodiment, a content image inputted to the image input section 30 may be motion images or a still image.

The image correction section 40 includes an image processing portion 44 and a trapezoidal correction portion 42, performs predetermined image correction that the image correction section 40 is instructed to perform on the image data to produce an image signal projectable by the image projection section 50, and transmits the produced image signal to the image projection section 50. The instruction of image correction is made by a user who operates the operation section 135. The image correction section 40 corresponds to a second correction section.

The image processing portion 44 performs grayscale correction, color correction, magnification correction, and other types of image processing on the image data.

The trapezoidal correction portion 42 performs trapezoidal correction on a displayed image projected and displayed by the projector 10 installed in an inclined attitude. In the present embodiment, the image capture section 110 captures a displayed image displayed on a screen SC, and the trapezoidal correction portion 42 corrects the image signal based on captured image data outputted from the image capture section 110. The corrected image signal generates a trapezoidally corrected image P2 (FIG. 3) that allows reduction in trapezoidal distortion of an image displayed on the screen SC.

The image signal corrected by the trapezoidal correction portion 42 is outputted to the instruction control section 120 as required.

The image projection section 50 produces modulated light based on the image signal outputted from the image correction section 40 and enlarges and projects the produced modulated light onto the screen SC.

Figure 2:
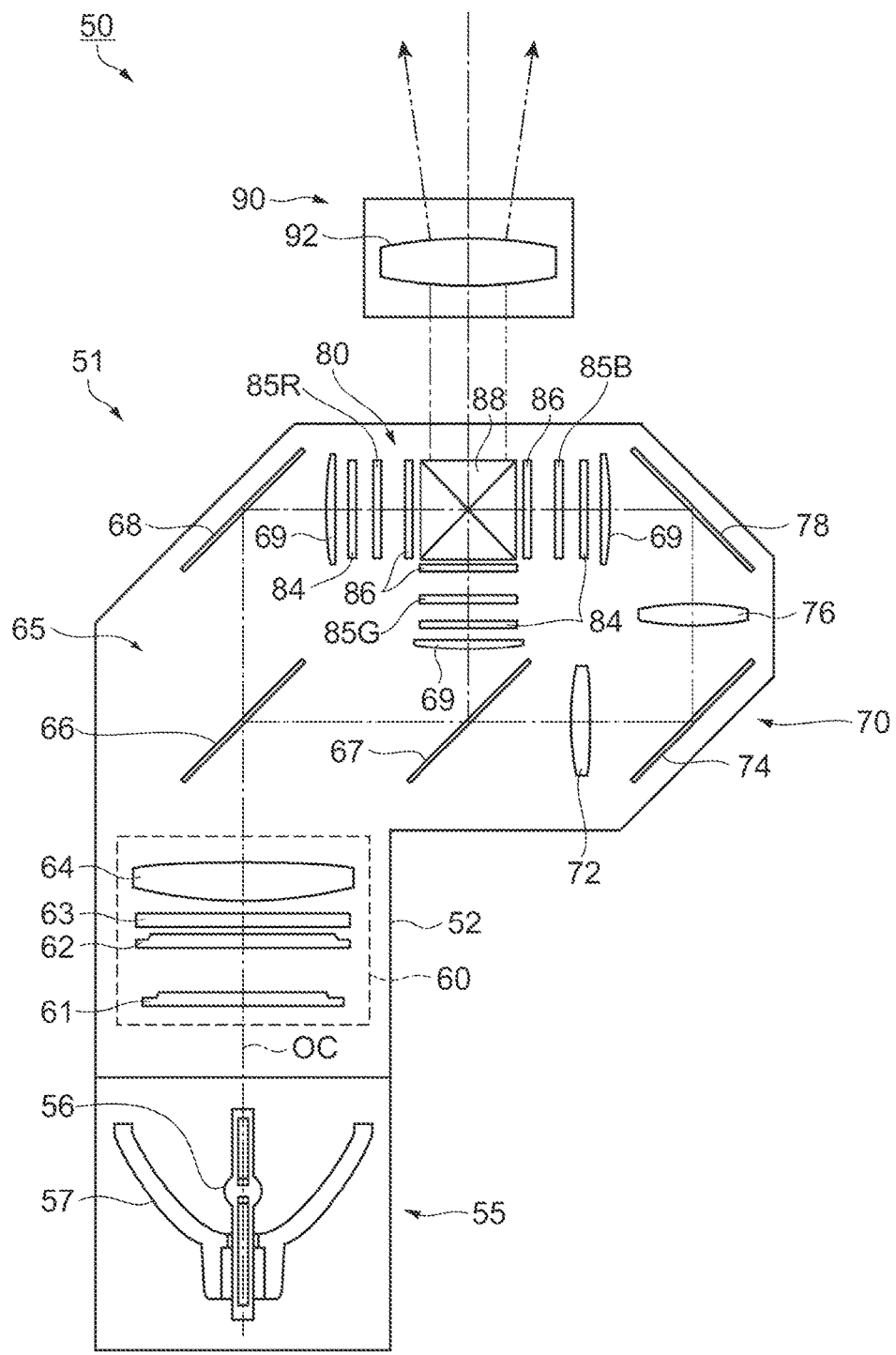
FIG. 2 diagrammatically shows the optical system of an image projection section.

FIG. 2 diagrammatically shows the optical system of the image projection section 50, and a schematic configuration of the optical system will be described with reference to FIG. 2.

The optical system of the image projection section 50 is configured in the form of an optical unit 51. The optical unit 51 includes an optical part enclosure 52, a light source apparatus 55, an illumination optical apparatus 60, a color separation optical apparatus 65, a relay optical apparatus 70, a light modulation apparatus 80, and a projection optical apparatus 90. Optical parts that form each of the apparatus are accommodated in the optical part enclosure 52.

The light source apparatus 55 includes an arc tube 56, which emits light fluxes, and a reflector 57. The light source apparatus 55 causes the light fluxes emitted from the arc tube 56 to be so reflected off the reflector 57 that the traveling directions of the reflected light fluxes are aligned with one another and directs the aligned light flux toward the illumination optical apparatus 60. An illumination optical axis OC is a central axis of the light flux outputted from the light source apparatus 55 toward an area to be illuminated.

The illumination optical apparatus 60 includes lens arrays 61 and 62, a polarization conversion element 63, a superimposing lens 64, and field lenses 69 and has a function of homogenizing the illuminance of the light flux outputted from the light source apparatus 55 in a plane perpendicular to the illumination optical axis OC.

The color separation optical apparatus 65 includes dichroic mirrors 66 and 67 and a reflection mirror 68 and separates the light flux outputted from the illumination optical apparatus 60 into three color light fluxes or red (R) light, green (G) light, and blue (B) light and guides the three color light fluxes to three liquid crystal devices 85R, 85G, and 85B.

The relay optical apparatus 70 includes a light-incident-side lens 72, a relay lens 76, and reflection mirrors 74 and 78. The relay optical apparatus 70 increases the length of the optical path of one of the color light fluxes separated by the color separation optical apparatus 65 (B light in the present embodiment) as compared with the lengths of the optical paths of the other light fluxes to prevent a decrease in light usage efficiency due, for example, to light divergence and guides the one light flux to the corresponding liquid crystal device 85 (liquid crystal device 85R in the present embodiment).

The light modulation apparatus 80 includes three light-incident-side polarizers 84, the three liquid crystal devices 85R, 85G, and 85B, three light-exiting-side polarizers 86, and a cross dichroic prism 88. The liquid crystal devices 85R, 85G, and 85B modulate the color light fluxes, which have been separated by the color separation optical apparatus 65, in accordance with the image signal. The cross dichroic prism 88 combines the color light fluxes modulated by the liquid crystal devices 85R, 85G, and 85B with one another and outputs the combined light toward the projection optical apparatus 90.

The projection optical apparatus 90 includes a projection lens 92, which enlarges the modulated, combined light flux from the light modulation apparatus 80 and projects the light flux onto the screen SC to display a projected image P3 (FIG. 3) based on the image signal on the screen SC.

Referring back to FIG. 1, the image capture section 110 captures the projected image P3 displayed on the screen SC and outputs image data on a captured image P4 (FIG. 3) generated in the image capturing process to the instruction control section 120 and the trapezoidal correction portion 42. The image capture section 110 further has a function of acquiring information on bright and dark information on the surface of the screen SC and information on brightness at the periphery of the screen SC and notifying the image processing portion 44 and an image correction portion 122 to control the brightness contained in the image signal.

In the present embodiment, the image capture section 110 is assumed to be a CCD camera built in the projector 10. Further, the image capture section 110 outputs the captured image P4 at predetermined time intervals based, for example, on the frame rate. The image capture section 110 corresponds to an imaging section.

The control unit 130 controls the action of each of the functional portions of the projector 10. In the present embodiment, the control unit 130 controls the action of each of the functional portions based on an action instruction issued from the operation section 135 operated by the user or an action instruction recognized by the instruction control section 120.

The instruction control section 120 includes an image correction portion 122, an image comparison portion 124, a spot detection portion 126, an action instruction portion 128, and an action instruction table 129. The instruction control section 120 detects movement of a high-luminance light spot formed on the screen SC by light rays in the visible region radiated from the laser pointer 150, which is an instruction apparatus, and a change in luminance of the light spot resulting from blinking thereof and acquires an action instruction issued to the projector 10 and related to the movement trajectory, the light emission pattern, and other attributes of the spot.

Figure 4:
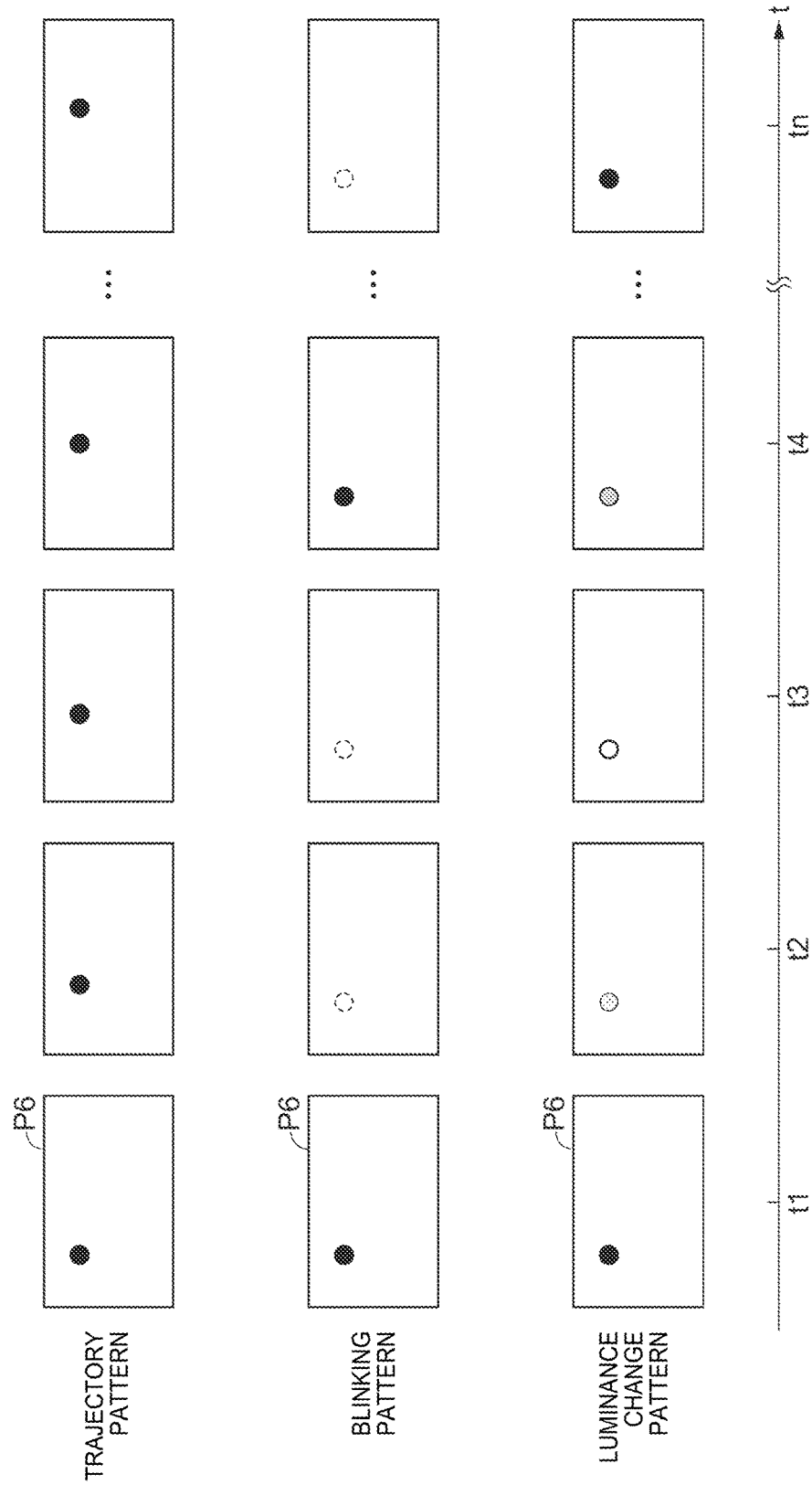
FIG. 4 shows a concept of difference images.

Processes carried out by the functional portions in the instruction control section 120 will be described also with reference to FIGS. 3 and 4, which show conceptual images.

The image correction portion 122 corrects image data on the captured image P4 captured by the image capture section 110 based on a variety of types of image correction that the image correction section 40 is instructed to perform to generate a corrected image P5.

In the present embodiment, the image correction is assumed to be correction corresponding to the trapezoidally corrected image P2 corrected by the trapezoidal correction portion 42. Other types of conceivable image correction may include correction for variation in brightness of the captured image P4 due to the brightness at the periphery of the screen SC and correction made to remove an effect of differences in optical characteristics between an imaging lens 115 and the projection lens 92 on image formation. The image correction portion 122 corresponds to a first correction section.

The image comparison portion 124 compares image data on the corrected image P5 generated by the image correction portion 122 with image data on the trapezoidally corrected image P2 corrected by the trapezoidal correction portion 42 to extract difference data. In the present embodiment, exclusive logical addition operation is performed on the two sets of image data on a pixel basis to extract difference data on object that is contained in the corrected image P5 but is not contained in the trapezoidally corrected image P2.

When an on-screen display function is so activated through operation performed on the projector 10 that a menu screen or any other screen is superimposed on the projected image P3, predetermined conversion is performed on data on the superimposed menu screen or any other screen, and the converted data is added to the image data on the trapezoidally corrected image P2. The image comparison portion 124 then compares the image data on the image to which the menu screen or any other screen has been added with the image data on the corrected image P5. In this case, the image to which the menu screen or any other screen has been added corresponds to the "original image."

The spot detection portion 126 performs filtering with a predetermined reference on the extracted difference data to remove noise components, extracts a spot formed on the screen SC by the laser light rays in the visible region emitted from the laser pointer 150, and generates a difference image P6 containing the spot. In the present embodiment, the spot detection portion 126 generates a difference image P6 in which trapezoidal correction or any other type of correction is removed, but it is conceivable to generate a difference image P6 with the correction maintained.

The filtering is configured to be capable of removing noise components based on an appropriately provided threshold for the density or frequency component at each pixel. The image comparison portion 124 and the spot detection portion 126 correspond to a generation section.

The action instruction portion 128 analyzes a plurality of difference images P6 sequentially created over a predetermined period and instructs the projection unit 20 to take an action based on a temporal change in the difference images P6. The action instruction portion 128 corresponds to an instruction section.

In the present embodiment, the action instruction portion 128 first acquires the difference image P6 repeatedly over a predetermined period. For example, a plurality of difference images P6 are acquired over a period from start timing (t=t1) to end timing (t=tn) at predetermined time intervals, as shown in FIG. 4.

The action instruction portion 128 then analyzes the plurality of difference images P6 to extract a change pattern in accordance with which the spot changes as time elapses. In the present embodiment, the change pattern is assumed to be a spot movement trajectory pattern, a spot blinking pattern (variation in frequency), a spot luminance change pattern (variation in intensity), and other patterns, and it is assumed to use one of the patterns or a combination thereof.

The action instruction portion 128 then refers to the action instruction table 129 and acquires an action instruction corresponding to a predetermined change pattern of the spot. An action instruction related to a predetermined change pattern is determined in advance and stored in the action instruction table 129.

The action instruction portion 128 subsequently sends the acquired action instruction to the projection unit 20 to instruct the projection unit 20 to take a predetermined action based on the action instruction.

The user can edit the action instruction table 129. Therefore, a frequently used action can be set as a simple change pattern, and a unique action can be set as an arbitrary change pattern.

It is conceivable to assign action instructions related to predetermined change patterns to a variety of functions including an interactive action. For example, a spot movement trajectory may be superimposed in the form of a drawn line on the projected image P3, and a displayed image may be saved in a flash memory and transferred to a printer or any other external apparatus (illustration thereof is omitted).

Further, an action instruction may instead call a menu on the operation section 135 to allow the user to select and perform a function displayed on the menu. Further, a zoom instruction that enlarges or reduces the projected image P3 and an area instruction that specifies an area to be zoomed may be included. Moreover, when a content image formed of motion images is handled, a motion image reproduction instruction including fast forwarding, reversing, and other types of action may be used.

When a content image inputted from a flash memory is a document formed of a plurality of pages, the action instruction may be a page turning instruction, a page returning instruction, a marking instruction using a highlighter pen. Further, the projector 10 is not necessarily used on a standalone basis. When the projector 10 is connected to a computer, for example, via a USB interface, the content image may be a document activated on the computer. In this case, a variety of instructions can conceivably be issued to the computer.

The functions of the control unit 130 and the image correction section 40 are achieved by cooperation among a CPU, a ROM, a RAM, and other types of hardware and software stored in the ROM or any other component (neither of them is shown).

The laser pointer 150, which forms a spot an image of which can be captured by the image capture section 110 on the screen SC, can be implemented in a variety of aspects. For example, when the laser pointer 150 emits laser light having a fixed intensity and frequency, a desired action can be specified by moving the laser light to form a spot trajectory pattern related to an action instruction. On the other hand, when the laser pointer 150 emits laser light having a variable intensity and frequency, a desired action can be specified by causing the laser pointer to emit laser light in such a way that a spot blinking pattern or a spot luminance change pattern related to action instructions is formed.

Figure 5:
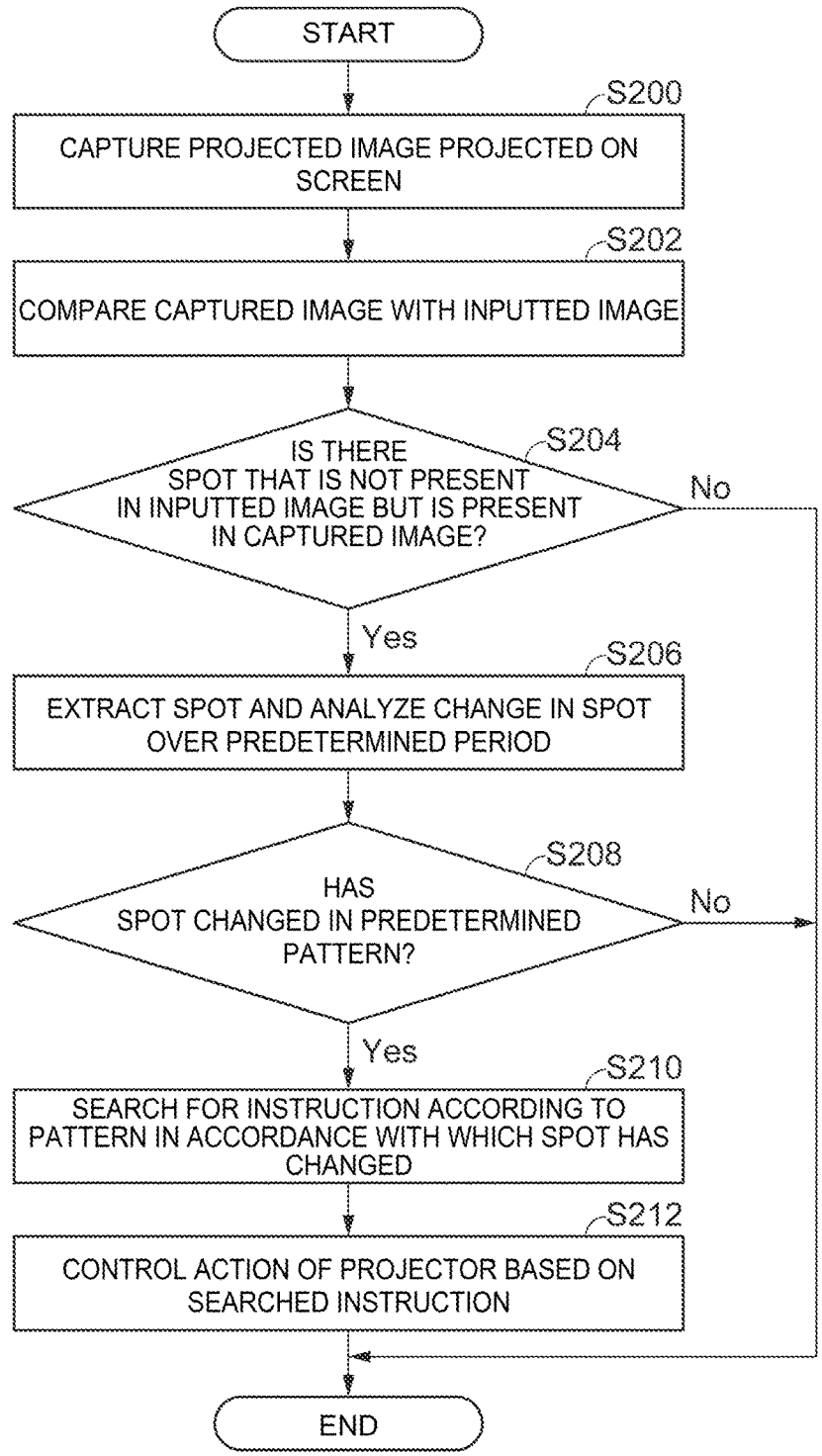
FIG. 5 is a flowchart showing the procedure of instruction action processes using a laser pointer.

FIG. 5 is a flowchart showing the procedure of instruction action processes (control method) using the laser pointer 150. The processes are carried out at predetermined intervals after a display step in which the projector 10 performs projection based on the inputted image P1.

The control unit 130 first captures the projected image P3 projected on the screen SC (step S200) <imaging step>.

The control unit 130 then compares the captured image and the inputted image (step S202) to produce the difference image P6 representing a difference between the two images. In the present embodiment, the trapezoidally corrected image P2 having been inputted and having undergone trapezoidal correction is compared with the corrected image P5 having been corrected in correspondence with the trapezoidal correction, but the images to be compared are not necessarily the images P2 and P5. It is conceivable that one of the captured image and the inputted image is corrected and the corrected image is compared with the other image that is not corrected.

The control unit 130 then acquires the difference between the captured image and the inputted image and evaluates whether or not there is a spot that is produced by the laser pointer 150 and is not contained in the inputted image but is contained in the captured image (step S204).

When the evaluation result shows that no spot is present (No in step S204), the series of processes are terminated.

On the other hand, when the evaluation result shows that a spot is present (Yes in step S204), the control unit 130 extracts the spot from a plurality of generated images to generate the difference image P6 and analyzes a change in the spot over a predetermined period (step S206) <generation step>.

The control unit 130 then evaluates whether or not the spot has changed in a predetermined change pattern (step S208).

When the evaluation result shows that the spot has not changed in any predetermined change pattern (No in step S208), the series of processes are terminated.

On the other hand, when the evaluation result shows that the spot has changed in a predetermined change pattern (Yes in step S208), the control unit 130 searches the action instruction table 129 for an instruction according to the predetermined change pattern in accordance with which the spot has changed (step S210).

The control unit 130 then controls the action of the projector 10 based on the searched instruction (step S212) <instruction step> and terminates the series of processes.

In the processes described above, when the user moves the spot produced by the laser pointer 150 in accordance with a desired change pattern on the screen SC on which the projected image P3 is projected by the projector 10, the projector 10 can recognize the change pattern of the spot and perform a function according to the change pattern.

According to the embodiment described above, the following advantageous effects are provided.

(1) When the laser pointer 150 is used to radiate a laser spot in accordance with a predetermined change pattern onto the screen SC on which the projector 10 projects an image, the projector 10 can perform a function according to the change pattern. The user who keeps grasping the laser pointer 150 can therefore readily instruct the projector 10 to perform desired operation.

(2) Since image data to be projected is inputted to the projector 10, an image used as a reference to extract a spot produced by the laser pointer 150 can be generated in the projector 10, whereby the spot can be readily and reliably detected.

(3) Since the laser light from the laser pointer 150 travels rectilinearly, the user can instruct the projector 10 to perform a desired action from a location far away from the projector 10.

The embodiment of the invention has been described with reference to the drawings. The specific configuration is not limited to the configuration in the embodiment and design changes and other modifications can be made to the extent that they do not depart from the substance of the invention. For example, the projector 10 is not limited to a liquid crystal projector employed in the embodiment and may instead, for example, be a DLP projector or an LCOS projector.

Further, when the user draws a character on the screen SC with the laser spot outputted from the laser pointer 150, the instruction control section 120 may identify the drawn character based on the spot trajectory. Moreover, the projector 10 may be instructed to take an action in accordance with a word expressed by the character.

Further, an apparatus that performs the method described above may be embodied by a single apparatus in some cases and may be embodied by a combination of a plurality of apparatus in other cases. In other words, the apparatus can be embodied in a variety of aspects.

The components and the combination thereof in the embodiment are presented by way of example, and addition, omission, replacement, and other changes can be made thereto to the extent that they do not depart from the substance of the invention. Further, the invention is not limited by the embodiment but is only limited by the appended claims.

What is claimed is:

1. A display apparatus comprising:
a display section that displays a displayed image on a display surface based on an original image;

an imaging section that captures an image of the display surface including the displayed image displayed on the display surface by the display section and additional light incident on the display surface and not displayed by the display section, and produces a captured image including the displayed image and the additional light;

a correction section that corrects the captured image and the original image;

a generation section that compares the captured image with the original image, after the correction section corrects the captured image and the original image, and generates a difference image representing a difference between the captured image and the original image; and an instruction section that instructs the display apparatus to take a predetermined action based on a temporal change in the difference image generated by the generation section, wherein the generation section generates the difference image by removing the original image from the captured image such that the difference image includes the additional light without the original image, the correction section includes a first correction section that corrects the captured image and a second correction section that corrects the original image, and the first correction section corrects the captured image based on an image correction that the second correction section performs to correct the original image.

2. The display apparatus according to claim 1,
wherein the instruction section instructs the display apparatus to take a display action using the display section, an action of switching an image displayed by the display section to another image, or an interactive action of manipulating the displayed image.

3. The display apparatus according to claim 1,
wherein the generation section extracts from the captured image a light spot that is not contained in the original image as the additional light, and generates the difference image containing the extracted light spot.

4. The display apparatus according to claim 3,
wherein the light spot is formed with light rays radiated toward the display surface.

5. The display apparatus according to claim 3,
wherein the instruction section extracts a change pattern in accordance with which the light spots changes as time elapses from the difference image formed of a plurality of difference images and instructs the display apparatus to take the predetermined action based on the extracted change pattern.

6. The display apparatus according to claim 5,
further comprising an action instruction table that relates the change pattern to an action instruction,
wherein the instruction section acquires the action instruction corresponding to the extracted change pattern from the action instruction table.

7. The display apparatus according to claim 6,
wherein the change pattern is at least one of a trajectory along which the light spot moves, a variation in frequency at which the light spot blinks, and a variation in luminance intensity of the light spot.

8. A display system comprising:
a display apparatus that displays an image; and
an instruction apparatus that instructs the display apparatus,
wherein the display apparatus includes
a display section that displays a displayed image on a display surface based on an original image,
an imaging section that captures an image of the display surface including the displayed image displayed on the display surface by the display section and additional light incident on the display surface and not displayed by the display section, and produces a captured image including the displayed image and the additional light,
a correction section that corrects the captured image and the original image,
a generation section that compares the captured image with the original image, after the correction section corrects the captured image and the original image, and generates a difference image representing a difference between the captured image and the original image, and
an instruction section that instructs the display apparatus to take a predetermined action based on a temporal change in the difference image generated by the generation section, and
wherein
the generation section generates the difference image by removing the original image from the captured image such that the difference image includes the additional light without the original image,
the instruction apparatus radiates light rays onto the display surface on which the displayed image is displayed to form a light spot, an image of which can be captured by the imaging section in such a way that the light spot is superimposed on the displayed image,
the correction section includes a first correction section that corrects the captured image and a second correction section that corrects the original image, and
the first correction section corrects the captured image based on an image correction that the second correction section performs to correct the original image.

9. A control method for a display apparatus comprising:
displaying a displayed image on a display surface based on an original image;
capturing an image of the display surface including the displayed image displayed on the display surface and additional light incident on the display surface and producing a captured image including the displayed image and the additional light;
correcting the captured image and the original image;
comparing the captured image with the original image, after the correcting of the captured image and the original image, and generating a difference image representing a difference between the captured image and the original image; and
instructing the display apparatus to take a predetermined action based on a temporal change in the generated difference image,
wherein
the difference image is generated by removing the original image from the captured image such that the difference image includes the additional light without the original image,
the captured image is corrected based on an image correction used to correct the original image.

* * * * *